(12) United States Patent
Takahashi et al.

(10) Patent No.: US 6,390,214 B1
(45) Date of Patent: May 21, 2002

(54) CONTROL DEVICE OF HYBRID DRIVE VEHICLE

(75) Inventors: Hideyuki Takahashi; Kenji Nakano; Shigetaka Kuroda; Teruo Wakashiro; Youichi Iwata, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/446,909

(22) PCT Filed: Apr. 2, 1999

(86) PCT No.: PCT/JP99/01752

§ 371 Date: Jan. 3, 2000

§ 102(e) Date: Jan. 3, 2000

(87) PCT Pub. No.: WO99/66184

PCT Pub. Date: Dec. 23, 1999

(30) Foreign Application Priority Data

Jun. 19, 1998 (JP) .............................. 10-173575

(51) Int. Cl.[7] .............................. B60K 6/02; G06F 7/04; F02D 25/04
(52) U.S. Cl. .......................... 180/65.2; 701/22; 60/706; 60/710
(58) Field of Search ................ 180/65.2, 65.8, 180/65.3, 65.4; 701/22; 60/698, 706, 710

(56) References Cited

U.S. PATENT DOCUMENTS

| | | | |
|---|---|---|---|
| 5,588,498 A | * 12/1996 | Kitada | 180/65.4 |
| 5,608,308 A | * 3/1997 | Kiuchi et al. | 180/65.2 |
| 5,722,359 A | * 3/1998 | Chubachi et al. | 123/192.2 |
| 5,732,681 A | * 3/1998 | Ogita | 123/492 |
| 5,806,617 A | 9/1998 | Yamaguchi | |
| 5,826,671 A | * 10/1998 | Nakae et al. | 180/85.2 |
| 5,862,497 A | * 1/1999 | Yano et al. | 701/22 |
| 5,875,864 A | * 3/1999 | Yano et al. | 180/65.4 |
| 6,124,690 A | * 9/2000 | Yano et al. | 318/376 |
| 6,140,780 A | * 10/2000 | Oshima et al. | 318/139 |

* cited by examiner

*Primary Examiner*—Lanna Mai
*Assistant Examiner*—Jeffrey J. Restifo
(74) *Attorney, Agent, or Firm*—Arent Fox Kintner Plotkin & Kahn, PLLC

(57) ABSTRACT

An apparatus for controlling a hybrid vehicle having an internal combustion engine and an electric motor as driving sources for the vehicle, in which when it is detected that an air-fuel ratio of a supply air-fuel mixture to the engine changed to the lean side value (S44~S46), the electric motor (2) is made operative as a motor in order to assist an output of the engine just after the detection (S47, S48). When it is detected that the air-fuel ratio of the supply air-fuel mixture changed to the rich side value (S44, S52, S53), the electric motor (2) is made operative as a generator for the purpose of the regeneration braking just after the detection (S54, S55). An output torque difference of the engine, therefore, when the air-fuel ratio of the supply air-fuel mixture changes can be sufficiently compensated without a time delay.

4 Claims, 13 Drawing Sheets

FIG. 7

| Ne / P_B | NE1 | NE2 | ------ | NE20 |
|---|---|---|---|---|
| PB1 | ASTPWR#n11 | ASTPWR#n21 | ------ | ASTPWR#n201 |
| PB2 | ASTPWR#n12 | ASTPWR#n22 | ------ | ASTPWR#n202 |
| ⋮ | ⋮ | ⋮ | ⋮ | ⋮ |
| PB10 | ASTPWR#n110 | ASTPWR#n210 | ------ | ASTPWR#n2010 |

FIG. 9

| Ne / P_B | NE1 | NE2 | ------ | NE20 |
|---|---|---|---|---|
| PB1 | REGEN#n11 | REGEN#n21 | ------ | REGEN#n201 |
| PB2 | REGEN#n12 | REGEN#n22 | ------ | REGEN#n202 |
| ⋮ | ⋮ | ⋮ | ====== | ⋮ |
| PB10 | REGEN#n110 | REGEN#n210 | ------ | REGEN#n2010 |

FIG. 10

| Ne / P_B | NE1 | NE2 | ------ | NE20 |
|---|---|---|---|---|
| PB1 | REGENBR#n11 | REGENBR#n21 | ------ | REGENBR#n201 |
| PB2 | REGENBR#n12 | REGENBR#n22 | ------ | REGENBR#n202 |
| ⋮ | ⋮ | ⋮ | ====== | ⋮ |
| PB10 | REGENBR#n110 | REGENBR#n210 | ------ | REGENBR#n2010 |

FIG. 13

| Ne / P_B | NE1 | NE2 | ------ | NE20 |
|---|---|---|---|---|
| PB1 | TrqST#n11 | TrqST#n21 | ------ | TrqST#n201 |
| PB2 | TrqST#n12 | TrqST#n22 | ------ | TrqST#n202 |
| ⋮ | ⋮ | ⋮ | ⋮ | ⋮ |
| PB10 | TrqST#n110 | TrqST#n210 | ------ | TrqST#n2010 |

CONTROL DEVICE OF HYBRID DRIVE VEHICLE

BACKGROUND OF THE INVENTION

1. Field of the Invention

The invention relates to an apparatus for controlling a hybrid vehicle having an internal combustion engine and a motor (electric motor) as driving sources for the vehicle.

2. Description of the Related Background Art

A hybrid vehicle having an engine and a motor as driving sources has conventionally been well known. For example, a control apparatus for the hybrid vehicle is shown in JP-A-3-121928.

In the control apparatus, the motor is driven and an output of the engine is controlled in accordance with a driving state of the vehicle. Specifically, an operating mode of the motor is discriminated in accordance with the driving state of the vehicle, in an accelerating mode, a driving electric power is supplied to the motor and the output of the engine is assisted, and in a decelerating mode, the motor is set into a regeneration braking state and a regeneration electric power by the motor is charged into a battery. The electric power charged in the battery is used as a motor driving electric power in the accelerating mode.

Even in the hybrid vehicle, an air-fuel ratio of an air-fuel mixture which is supplied to the engine is controlled in accordance with the driving state of the vehicle. For instance, when the driving state indicates a cruising driving, a target air-fuel ratio is set to a lean air-fuel ratio (for example, 16) for the purpose of improvement of mileage and a lean burn control is performed. In a driving state where an engine output is needed, the target air-fuel ratio is set to a stoichiometric air-fuel ratio (for example, 14.7) and a stoichiometric burn control is performed. In the lean burn control, since an output torque of the engine decreases as compared with that in the stoichiometric burn control, a difference of the output torque of the engine is large at the time of driving in the case where the control suddenly changes from the lean burn control to the stoichiometric burn control or from the stoichiometric burn control to the lean burn control. When this occurs, a torque shock results.

It is well known that an electronic throttle valve control apparatus to control an opening degree of a throttle valve of an internal combustion engine is used to reduce the torque shock. According to the electronic throttle valve control apparatus, ordinarily, when a driver operates an acceleration pedal, the opening degree of the throttle valve is controlled so that the driver can obtain a proper speed sense in correspondence to the operation of the acceleration pedal. At the time of the sudden change of the air-fuel ratio as mentioned above, the electronic throttle valve control apparatus controls the opening degree of the throttle valve irrespective of the operation of the acceleration pedal and operates so that the output torque of the engine does not suddenly change. There is also a case where a secondary air supplying apparatus for supplying secondary air into an intake pipe arranged on the downstream of the throttle valve is used to similarly reduce the torque shock.

Even if the electronic throttle valve control apparatus or secondary air supplying apparatus operates in order to prevent the change in output torque of the engine when the air-fuel ratio suddenly changes, however, there is a problem that the output torque difference cannot be sufficiently compensated so as not to cause a torque shock because of a time delay which is caused until a control result is reflected due to a delay of the air supply to the engine.

SUMMARY OF THE INVENTION

It is, therefore, an object of the present invention to provide a control apparatus of a hybrid vehicle which can sufficiently compensate an output torque difference of an engine at the time of sudden change of an air-fuel ratio of a supply air-fuel mixture without a time delay.

According to the present invention, there is provided a control apparatus of a hybrid vehicle having an internal combustion engine and an electric motor as driving sources for the vehicle, the electric motor operating as a motor to assist an output of the internal combustion engine and operating as a generator to regenerate running energy of the vehicle and to charge voltage storage means. The apparatus comprises: air-fuel ratio detecting means for detecting a change in air-fuel ratio of an air-fuel mixture which is supplied to the engine; and electric motor control means for making the electric motor operative as a motor when it is detected by the air-fuel ratio detecting means that the air-fuel ratio has changed from a rich side value to a lean side value, and for making the electric motor operative as a generator when it is detected that the air-fuel ratio changed from the lean side value to the rich side value.

According to the control apparatus of a hybrid vehicle of the invention, for example, when it is detected that the air-fuel ratio of the supply air-fuel mixture to the engine changed to the lean side value because the control is changed from the stoichiometric burn control to the lean burn control, the electric motor is made operative as a motor in order to assist the output of the engine immediately after that, and for instance, when it is detected that the air-fuel ratio of the supply air-fuel mixture changed to the rich side value because the control is changed from the lean burn control to the stoichiometric burn control, the electric motor is made operative as a generator for the purpose of regeneration braking immediately after that. The output torque difference of the engine, therefore, at the time of the change in air-fuel ratio of the supply air-fuel mixture can be sufficiently compensated without a time delay.

In the control apparatus of a hybrid vehicle of the invention, the output torque difference of the internal combustion engine when the change in the air-fuel ratio is detected is presumed in accordance with the driving state of the vehicle, and one of a driving force and a regeneration braking force of the electric motor is controlled in accordance with the presumed output torque difference, so that a proper driving state or regenerating state of the motor can be obtained for the output torque difference of the engine at the time of the change in air-fuel ratio of the supply air-fuel mixture.

Further, in the control apparatus of a hybrid vehicle of the invention, when it is detected by the air-fuel ratio detecting means that the air-fuel ratio has changed to the lean side value, the electric motor is made operative as a motor and, after that, the driving force of the motor is gradually decreased, and when it is detected by the air-fuel ratio detecting means that the air-fuel ratio has changed to the rich side value, the electric motor is made operative as a generator and, after that, the regeneration braking force of the generator is gradually reduced, so that the force can be made coincide with the proper output torque after the sudden change of the air-fuel ratio without causing a torque shock.

BRIEF DESCRIPTION OF THE DRAWINGS

FIG. 7 is a diagram showing an ASTPWR data map at the time of acceleration;

FIG. 9 is a diagram showing a first deceleration REGEN data map;

FIG. 10 is a diagram showing a second deceleration REGEN data map;

FIG. 13 is a diagram showing a stoichiometric torque data map;

DETAILED DESCRIPTION OF THE PREFERRED EMBODIMENT

An embodiment of the present invention will now be described in detail hereinbelow with reference to the drawings.

Figure 1:
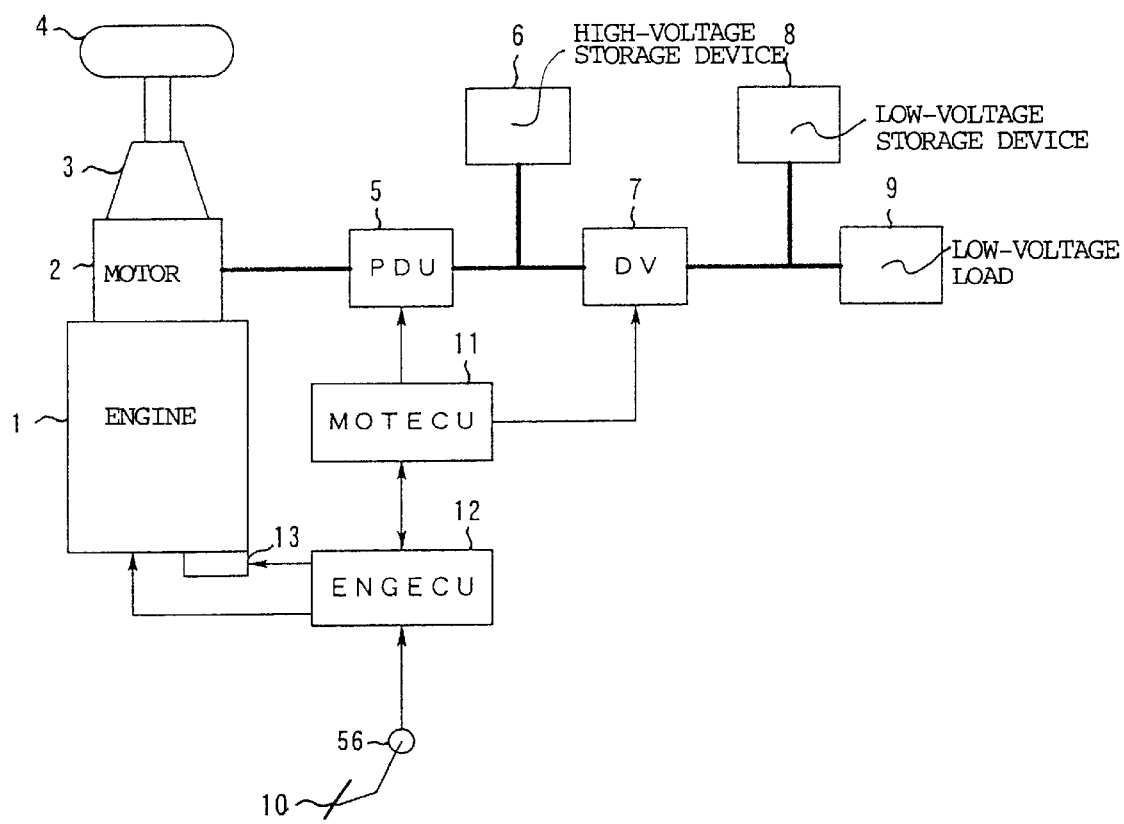
FIG. 1 is a block diagram showing an embodiment of the invention.

FIG. 1 shows a control apparatus of a hybrid vehicle according to the present invention. In the control apparatus of a hybrid vehicle, a crank shaft of an engine 1 is directly coupled to a rotary shaft of a DC motor 2 as an electric motor. The rotation of the rotary shaft of the motor 2 is transferred to a driving wheel 4 through a transmission mechanism 3. The transmission mechanism 3 is of the manual type. A PDU (power drive unit) 5 is connected to the motor 2. The PDU 5 supplies a driving electric power to the motor 2 in an assist operating mode in which the motor 2 is driven and made operative as a motor so as to assist an output of the engine 1. The PDU 5 supplies a regeneration electric power of the motor 2 to a high voltage storage device 6 comprising, for example, a capacitor in a regeneration operating mode in which the driving electric power is not supplied but the motor 2 is made operative as a generator.

A DV (down converter) 7 is connected to a connecting line between the PDU 5 and high voltage storage device 6. The DV 7 converts a high voltage on the connecting line to a low voltage of approximately 12V. A storage device 8 as a low voltage capacitor is connected to an output of the DV 7 and a low voltage load 9 of the vehicle is also connected.

Figure 2:
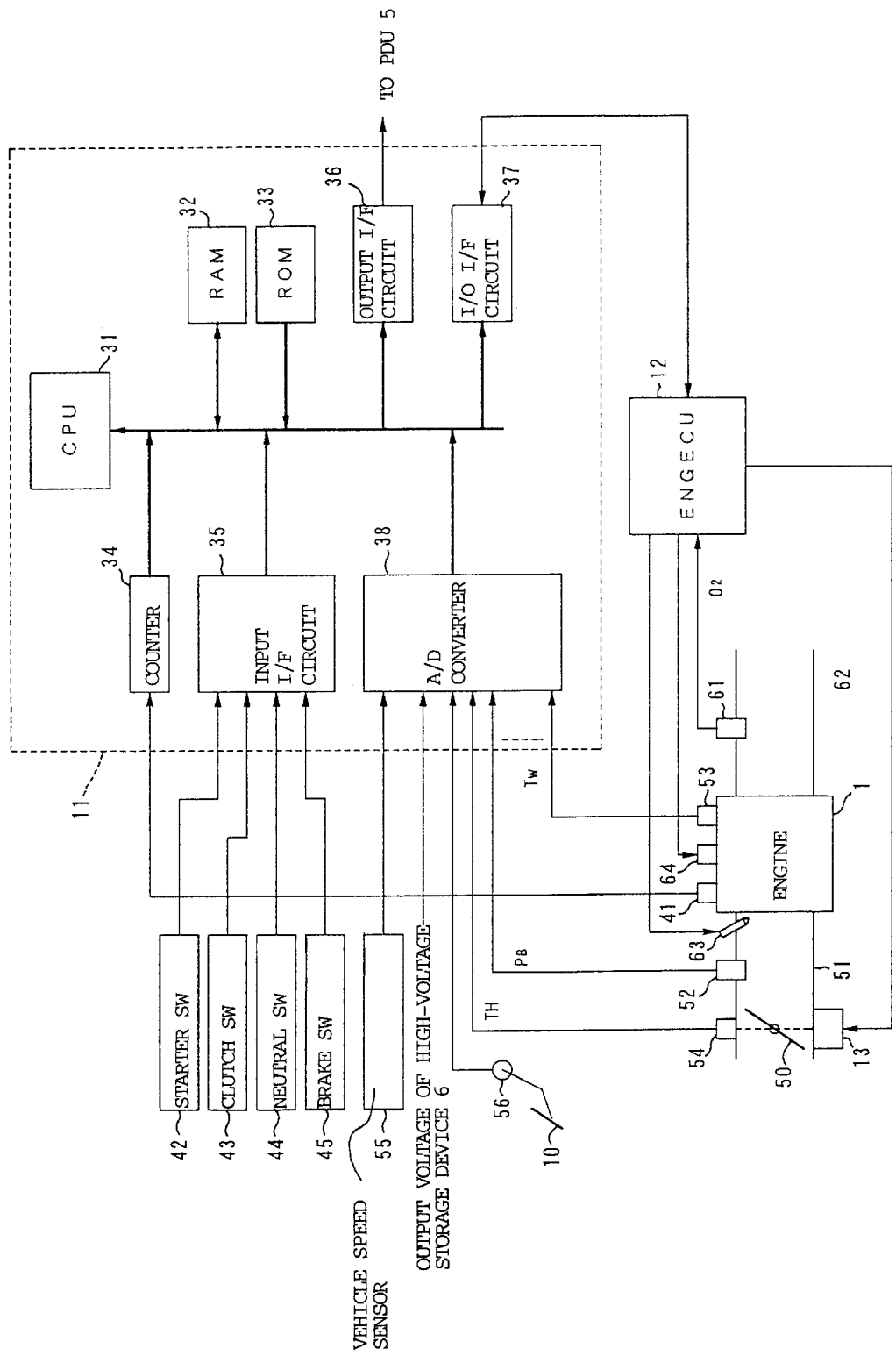
FIG. 2 is a block diagram showing an internal construction of an MOTECU in an apparatus in FIG. 1.

The rotation of the motor 2 is controlled by an MOTECU (motor electronic control unit) 11 through the PDU 5. As shown in FIG. 2, the MOTECU 11 has: a CPU 31; an RAM 32; an ROM 33; a counter 34; an input interface (I/F) circuit 35; an output interface (I/F) circuit 36; an input/output interface circuit 37; and an A/D converter 38. The CPU 31, RAM 32, ROM 33, counter 34, input I/F circuit 35, output I/F circuit 36, I/O I/F circuit 37, and A/D converter 38 are connected in common to a bus.

The counter 34 is reset by a crank pulse generated from a crank angle sensor 41 and counts the number of clock pulses generated from a clock generator (not shown), thereby generating a signal indicative of an engine rotational speed $N_e$.

A starter switch 42 to detect a start of the engine 1, a clutch switch 43 to detect an ON/OFF state of a clutch (not shown) in the transmission mechanism 3, a neutral switch 44 to detect a neutral state of the transmission mechanism 3, and a brake switch 45 to detect the operation of a brake pedal are connected to the input I/F circuit 35. The input I/F circuit 35 holds and outputs data indicative of the ON/OFF state of each of the switches 42 to 45.

The A/D converter 38 is provided to convert analog signals from a plurality of sensors for detecting vehicle driving parameters such as intake pipe inner pressure $P_B$, cooling water temperature $T_W$, throttle valve opening degree TH, vehicle speed $V_S$, acceleration pedal opening degree AP, and the like into digital signals. The intake pipe inner pressure $P_B$ is detected by an intake pipe inner pressure sensor 52 provided for an intake pipe 51 arranged on the downstream of a throttle valve 50. The cooling water temperature $T_W$ is detected by a cooling water temperature sensor 53. The throttle valve opening degree TH is detected by a throttle opening degree sensor 54. Further, the vehicle speed $V_S$ is detected by a vehicle speed sensor 55. The acceleration pedal opening degree AP as an operation opening degree of an acceleration pedal 10 is detected by an acceleration pedal sensor 56. A voltage across the high voltage storage device 6 is supplied to the A/D converter 38. A voltage QCAP across the high voltage storage device 6 is derived as a digital value from an output of the A/D converter 38.

The output I/F circuit 36 sets the operation of the PDU 5 in response to an assist amount instruction or a regeneration amount instruction which is formed by the operation of the CPU 31, which will be explained hereinlater. The input/output I/F circuit 37 is a circuit to communicate data with an ENGECU (engine electronic control unit) 12. An assist electric power (driving electric power) according to an assist amount ASTPWR designated by the assist amount instruction is supplied from the PDU 5 to the motor 2. The PDU 5 obtains a regeneration electric power according to a regeneration amount REGEN designated by the regeneration amount instruction, from the motor 2 and supplies it to the high voltage storage device 6 and DV 7.

The ENGECU 12 performs an engine control such as fuel injection control, ignition timing control, or the like of the engine 1. Although a connecting line is omitted in FIG. 2, the crank angle sensor 41, switches 41 to 45, and various sensors 52 to 56 are connected to the ENGECU 12 and an oxygen concentration sensor 61 is also connected. The oxygen concentration sensor 61 is provided for an exhaust pipe 62 and detects oxygen concentration $O_2$ in exhaust gas. The oxygen concentration sensor 61 is a sensor of a binary output type for generating different levels at air-fuel ratios on the rich side and lean side while a stoichiometric air-fuel ratio is used as a threshold value. Since an internal construction of the ENGECU 12 is similar to that of the MOTECU 11, its description is omitted here. In the ENGECU 12, a fuel injection control routine is processed by a CPU (not shown) and a fuel injection time $T_{out}$ is determined by using the vehicle driving parameters and engine rotational speed $N_e$. The fuel injection time $T_{out}$ is calculated by using, for example, the following calculating equation.

$$T_{out} = T_i \times K_{O2} \times K_{WOT} \times K_{LS} \times K_{TW} \times K_{TA} + T_{ACC} + T_{DEC}$$

Where, $T_i$ indicates a basic fuel injection time as an air-fuel ratio reference control value which is determined by searching a data map from an ROM in the ENGECU 12 in accordance with the engine rotational speed $N_e$ and intake pipe inner pressure $P_B$. $K_{O2}$ denotes an air-fuel ratio correction coefficient which is calculated in an air-fuel ratio feedback control. $K_{WOT}$ denotes a fuel increase amount correction coefficient at the time of a high load as in the case where the throttle valve is fully opened. $K_{LS}$ denotes a lean fuel coefficient. $K_{TW}$ indicates a cooling water temperature correction coefficient which is set in accordance with the cooling water temperature $T_W$. $K_{TA}$ shows an intake air temperature correction coefficient which is set in accordance with an intake air temperature $T_A$. $T_{ACC}$ denotes an acceleration increase value which is set in accordance with a degree of acceleration of the engine rotational speed $N_e$. $T_{DEC}$ shows a deceleration decrease value which is set in accordance with a degree of deceleration of the engine rotational speed $N_e$. The correction coefficients $K_{WOT}$, $K_{LS}$, $K_{TW}$, and $K_{TA}$, acceleration increase value $T_{ACC}$, and deceleration decrease value $T_{DEC}$ are determined by searching the data map in the ROM.

For deciding the fuel injection time $T_{out}$, there are at least a rich burn control, a lean burn control, and a stoichiometric burn control. Whether the rich burn control, lean burn control, and stoichiometric burn control is executed is determined in accordance with the driving state of the vehicle. At the time of the rich burn control, a target air-fuel ratio is set to a value (for example, 11) smaller than the stoichiometric air-fuel ratio (for example, 14.7) and the air-fuel ratio correction coefficient $K_{O2}$ and fuel increase amount correction coefficient $K_{WOT}$ are determined so as to obtain the target air-fuel ratio. At the time of the lean burn control, the target air-fuel ratio is set to a value (for example, 16) larger than the stoichiometric air-fuel ratio (for example, 14.7) and the air-fuel ratio correction coefficient $K_{O2}$ and lean fuel coefficient $K_{LS}$ are determined so as to obtain the target air-fuel ratio. At the time of the stoichiometric burn control, whether the air-fuel ratio is richer or leaner than the stoichiometric air-fuel ratio as a target air-fuel ratio is discriminated on the basis of an output level of the oxygen concentration sensor 61, and the air-fuel ratio correction coefficient $K_{O2}$ is set in accordance with a result of the discrimination. The air-fuel ratio correction coefficient $K_{O2}$ set as mentioned above is used in the calculating equation of the fuel injection time $T_{out}$ and the fuel injection time $T_{out}$ is determined.

An injector 63 is driven only for the determined fuel injection time $T_{out}$. The injector 63 is arranged near an intake port of the intake pipe 51 of the internal combustion engine and injects the fuel when it is driven. In the ENGECU 12, the ignition timing control routine is processed by the CPU and a spark discharge of a spark plug (not shown) of an ignition device 64 is performed in accordance with the ignition timing control.

Further, since the throttle valve 50 is a so-called drive-by-wire (DBW) type valve, a throttle actuator 13 to open the throttle valve 50 is provided for the engine 1. In the ENGECU 12, a throttle valve opening degree control routine is processed by the CPU, and a target throttle valve opening degree $\theta_{th}$ is determined in accordance with the vehicle driving parameters such as throttle valve opening degree TH, vehicle speed $V_s$, acceleration pedal opening degree AP. The opening degree of the throttle valve 50 is controlled through the throttle actuator 13 so as to obtain the target throttle valve opening degree $\theta_{th}$.

The control operation for the motor 2 will now be described mainly with respect to the operation of the CPU 31. The CPU 31 of the MOTECU 11 repetitively executes a motor control routine, for example, at every 10 msec, discriminates the operating mode at that time as shown below, and sets the assist amount ASTPWR or regeneration amount REGEN corresponding to the discriminated operating mode.

Figure 3:
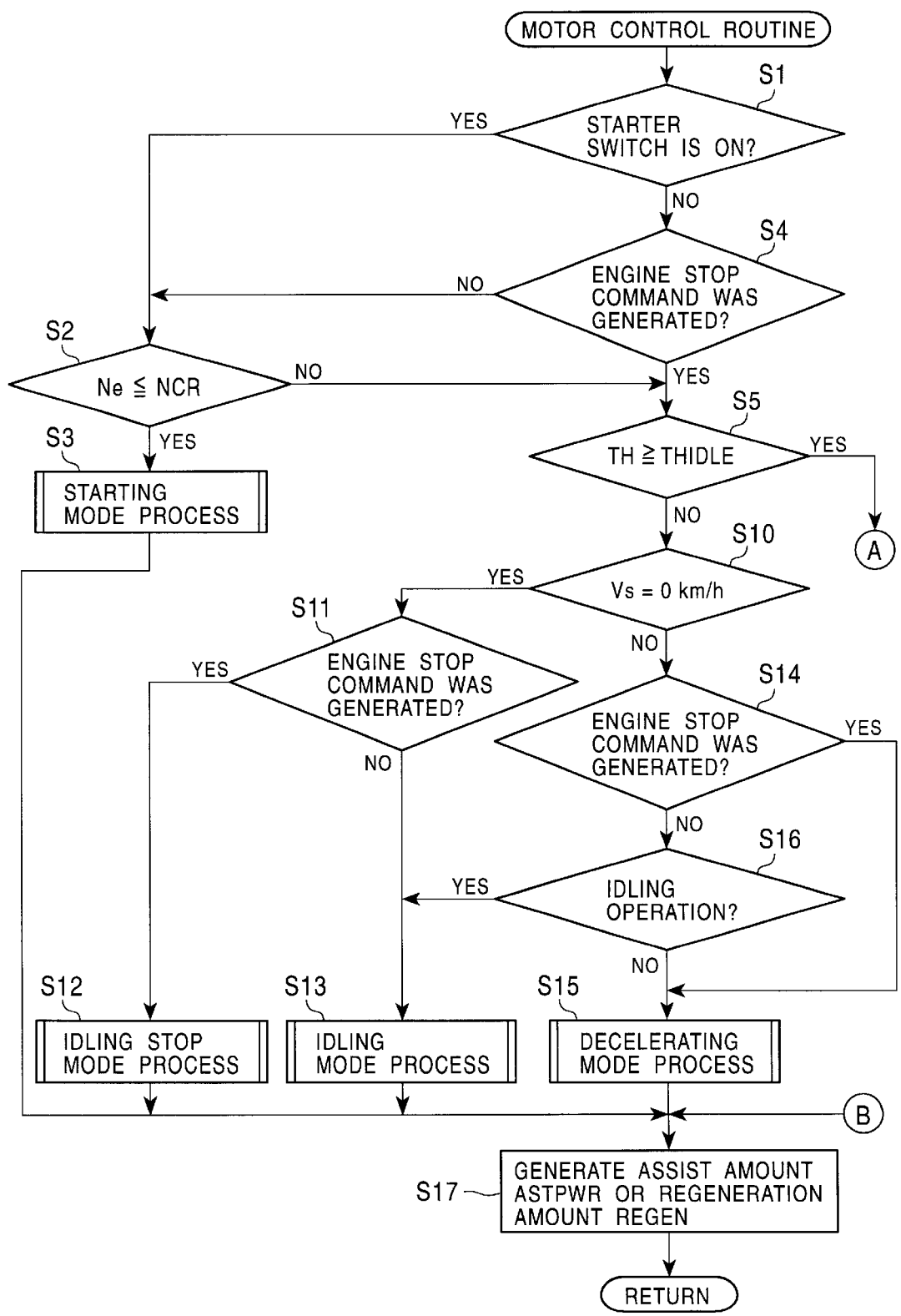
FIG. 3 is a flowchart showing a motor control routine.
Figure 4:
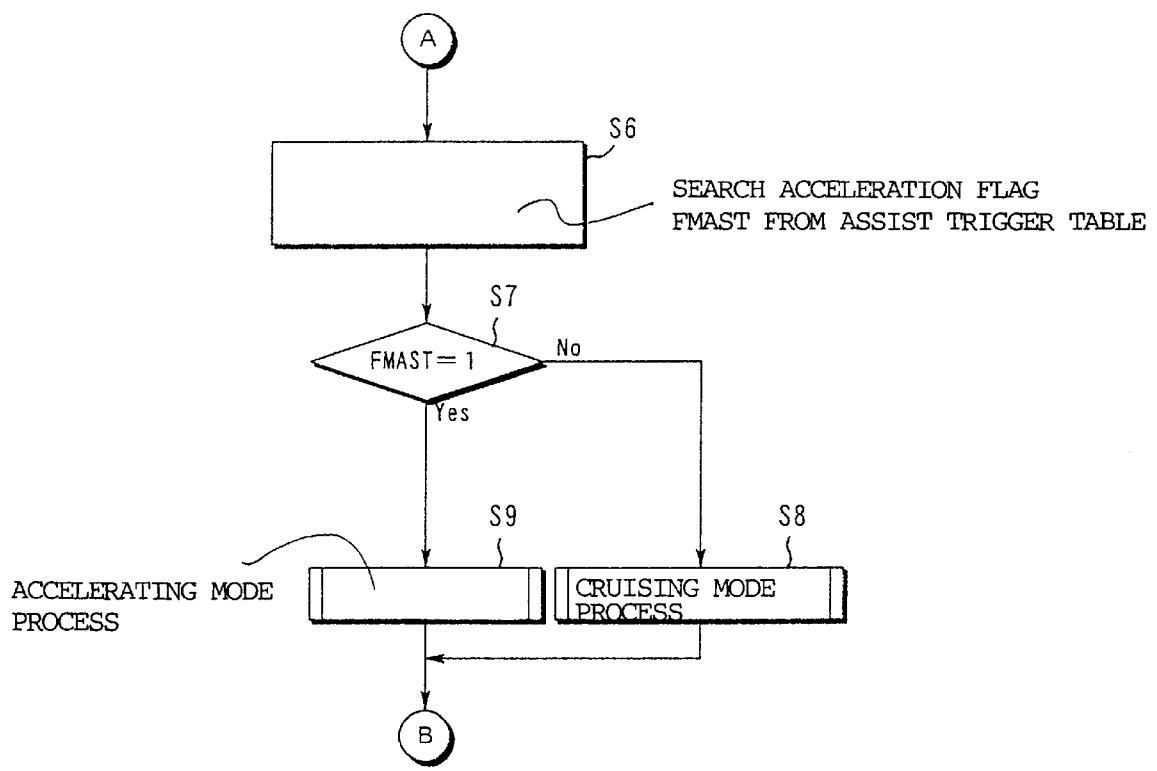
FIG. 4 is a flowchart showing a continuing portion of the motor control routine of FIG. 3.

In the motor control routine, as shown in FIGS. 3 and 4, the CPU 31 first discriminates whether the starter switch 42 is ON or not (step S1). When the starter switch 42 is ON in order to start the engine 1, whether the engine rotational speed $N_e$ is equal to or less than a stall rotational speed NCR (for example, 50 r.p.m.) at which it can be regarded that the engine is stopped or not is discriminated (step S2). When $N_e \leq$ NCR, a starting mode to start the engine 1 is executed as a motor operation (step S3).

When it is decided in step S1 that the starter switch 42 is OFF, whether an engine stop command has been generated or not is discriminated (step S4). The engine stop command is generated as a set of an engine stop command flag when it is determined that the vehicle is in a driving state where the driving of the engine should be stopped in the execution of an engine stop discriminating routine. If the engine stop command is not generated, step S2 follows and whether the engine rotational speed $N_e$ is equal to or less than the stall rotational speed NCR or not is discriminated. When the engine stop command is generated, the opening degree TH of the throttle valve 50 is obtained from the output of the A/D converter 38 and whether the throttle valve opening degree TH of the throttle valve 50 is equal to or larger than a predetermined idling opening degree THIDLE (opening degree of almost full closure) or not is discriminated (step S5). If $N_e >$ NCR in step S2, namely, when the engine 1 is driving, step S5 is executed. When TH $\geq$ THIDLE, an acceleration flag FMAST is searched from an assist trigger table (step S6).

Figure 5:
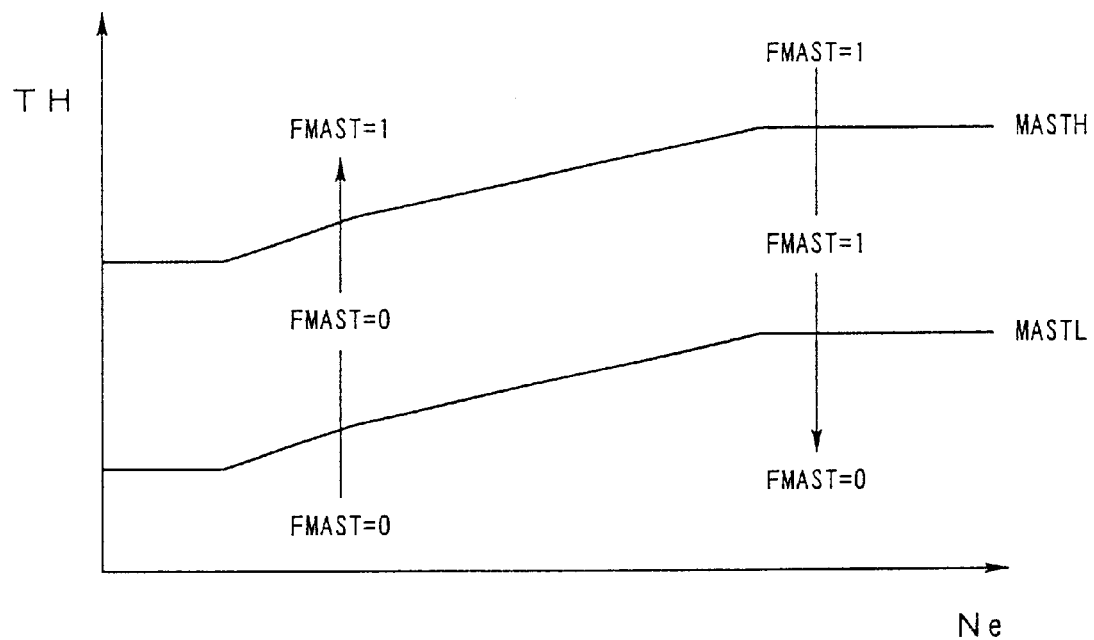
FIG. 5 is a diagram showing setting characteristics of an acceleration flag FMAST according to an assist trigger table.

The assist trigger table has previously been written in the ROM 33 and, as shown in FIG. 5, the acceleration flag FMAST is set in accordance with the engine rotational speed $N_e$ and throttle valve opening degree TH. That is, threshold values MASTH and MASTL gradually increase in accordance with an increase of engine rotational speed $N_e$. When the throttle valve opening degree TH increases from a value that is equal to or less than the threshold value MASTL, the FMAST=0 until TH exceeds the threshold value MASTH. When TH exceeds the threshold value MASTH, FMAST=1 as a driving state where the speed should be accelerated. On the contrary, when the throttle valve opening degree TH decreases from a value that is equal to or larger than the threshold value MASTH, FMAST=1 until TH is smaller than the threshold value MASTL. When TH is smaller than the threshold value MASTL, FMAST=0.

After executing step S6, whether the searched acceleration flag FMAST is equal to "1" or not is discriminated (step S7). When FMAST=0, the operating mode is set to a cruising mode (step S8). When FMAST=1, the operating mode is set to an accelerating mode (step S9).

When it is determined in step S5 that TH<THIDLE, the throttle valve 50 is almost fully closed. Then, whether the vehicle speed $V_s$ is equal to 0 km/h or not is discriminated (step S10). When $V_s$=0 km/h, the vehicle is stopped. Then, whether the engine stop command has been generated or not is discriminated (step S11). This process is similar to that in step S4. When the engine stop command is generated, the operating mode is set to an idling stop mode in order to stop the driving of the engine 1 (step S12). When the engine stop command is not generated, the operating mode is set to an idling mode in order to continue the idling driving of the engine 1 (step S13).

When $V_s$ . 0 km/h in step S10, the vehicle is running. Then, whether the engine stop command has been generated or not is discriminated (step S14). This process is similar to that in step S4. When the engine stop command is generated, the operating mode is set to a decelerating mode in order to decelerate the driving of the engine 1 (step S15). When the engine stop command is not generated, whether an idling driving of the engine 1 has been requested or not is discriminated (step S16). The idling driving request is generated as a set of idling flag when it is determined that the engine 1 should be set to the idling driving state in the execution of an engine idling discriminating routine. When there is the idling driving request of the engine 1, the operating mode is set into the idling mode (step S13). When there is not the idling driving request, the operating mode is set to the decelerating mode (step S15).

In each of the operating mode processes in steps S8, S9, S12, S13, and S15, the assist amount ASTPWR or regeneration amount REGEN is set. For example, the assist amount ASTPWR is set in an accelerating mode process, which will be explained hereinlater. The regeneration amount REGEN is set in a decelerating mode process. The CPU 31 generates the set assist amount ASTPWR or regeneration amount REGEN to the output I/F circuit 36 (step S17). The output I/F circuit 36 controls the operation of the PDU 5 in accordance with the assist amount ASTPWR or regeneration amount REGEN supplied from the CPU 31. In the case of the assist amount ASTPWR, the PDU 5 supplies an assist electric power according to the assist amount ASTPWR to the motor 2. In the case of the regeneration amount REGEN, the motor 2 is in a regeneration braking state and the PDU 5 obtains a regeneration electric power according to the regeneration amount REGEN from the motor 2 and supplies it to the high voltage storage device 6 or DV 7.

Figure 6:
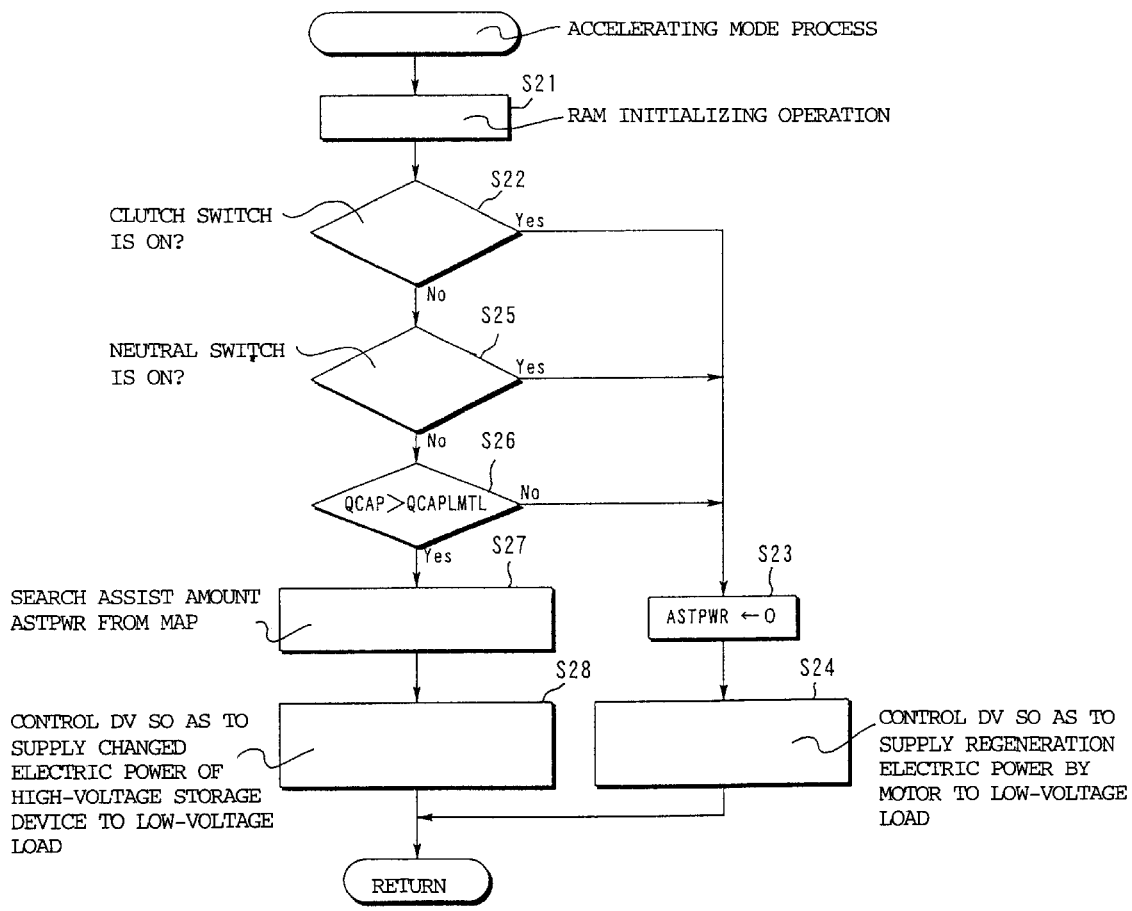
FIG. 6 is a flowchart showing an accelerating mode process.

In the accelerating mode process, the CPU 31 first performs an RAM initializing operation (step S21) as shown in FIG. 6. In the initializing operation, for example, the value of the regeneration amount REGEN or the like temporarily stored in the RAM 32 is set to "0". After the initializing operation, the CPU 31 reads out the ON/OFF state of the clutch switch 43 and discriminates whether the clutch is in a power transmission state or not (step S22). When the clutch switch 43 is ON, since the clutch is in a power-off state, the assist amount ASTPWR is set to "0" (step S23). The DV 7 is controlled so as to supply the regeneration electric power from the motor 2 to the low voltage load 9 (step S24).

When the clutch switch 43 is OFF, the clutch is in the power transmission state. Then, the ON/OFF state of the neutral switch 44 is read out and whether the transmission mechanism 3 is in a neutral state or not is discriminated (step S25). When the transmission mechanism 3 is in the neutral state because the neutral switch 44 is ON, the processing routine advances to step S23 and the assist amount ASTPWR is set to "0".

When the transmission mechanism 3 is in an in-gear state since the neutral switch 44 is OFF, the voltage QCAP across the high voltage storage device 6 is read out and whether the voltage QCAP is larger than a lower limit threshold value QCAPLMTL or not is discriminated (step S26). The lower limit threshold value QCAPLMTL can be set to a valid voltage which can be assisted by the motor 2, for example, approximately 70% of a full charging voltage of the storage device 6 and can be properly set by a capacitance of the storage device 6. If QCAP≦QCAPLMTL, step S23 follows and the assist amount ASTPWR is set to "0". If QCAP>QCAPLMTL, the assist amount ASTPWR is obtained by searching the map (step S27). As shown in FIG. 7, the assist amount ASTPWR which is determined in accordance with the engine rotational speed $N_e$ and throttle valve opening degree TH has previously been written in the ROM 33 as an acceleration ASTPWR data map as shown by ASTPWR#n11~ASTPWR#n2010. The assist amount ASTPWR corresponding to the engine rotational speed $N_e$ and throttle valve opening degree TH at that time can be searched from the acceleration ASTPWR data map. After step S27 was executed, the CPU 31 controls the DV 7 so as to supply the charged electric power in the high voltage storage device 6 to the low voltage load 9 (step S28).

Figure 8:
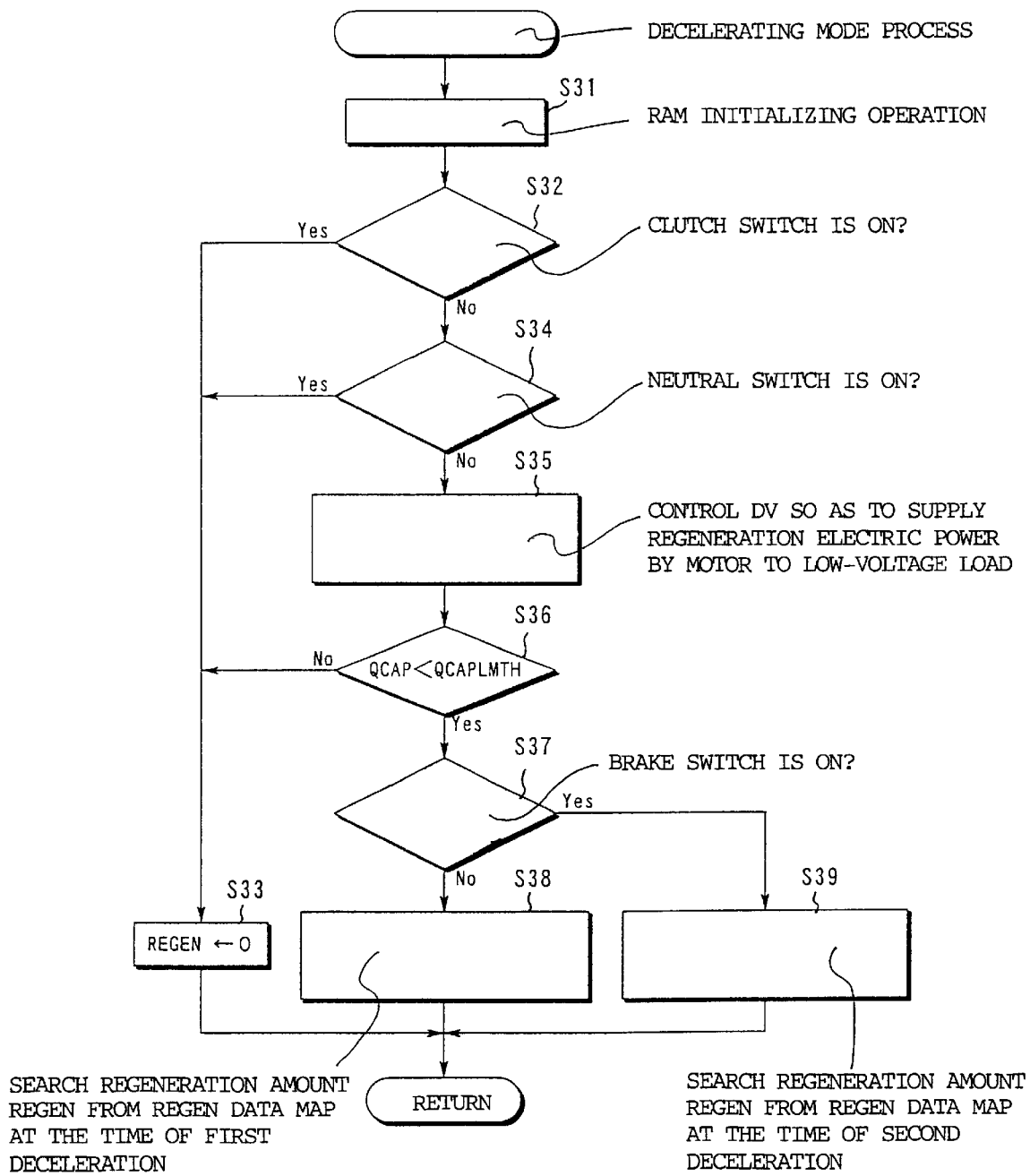
FIG. 8 is a flowchart showing a decelerating mode process.

In the decelerating mode process, the CPU 31 first performs an RAM initializing operation (step S31) as shown in FIG. 8. In the initializing operation, for example, the value of the assist amount ASTPWR or the like temporarily stored in the RAM 32 is set to "0". After completion of the initializing operation, the CPU 31 reads the ON/OFF state of the clutch switch 43 and discriminates whether the clutch is in a power transmission state or not (step S32). When the clutch switch 43 is ON, the clutch is in the power-off state. Then, the regeneration amount REGEN is set to "0" (step S33).

If the clutch switch 43 is OFF, the clutch is in the power transmission state. Then, the ON/OFF state of the neutral switch 44 is read out and whether the transmission mechanism 3 is in the neutral state or not is discriminated (step S34). When the transmission mechanism 3 is in the neutral state because the neutral switch 44 is ON, step S33 follows and the regeneration amount REGEN is set to "0".

When the transmission mechanism 3 is in the in-gear state because the neutral switch 44 is OFF, the DV 7 is controlled so as to supply the regeneration electric power from the motor 2 to the low voltage load 9 (step S35). The voltage QCAP across the high voltage storage device 6 is read and whether the voltage QCAP is larger than an upper limit threshold value QCAPLMTH or not is discriminated (step S36). The upper limit threshold value QCAPLMTH can be set to a voltage which can be charged by the regeneration, for example, approximately 90% of the full charging voltage of the storage device 6 and can be properly set in accordance with the capacitance of the storage device 6. If QCAP≦QCAPLMTH, step S33 follows and the regeneration amount REGEN is set to "0". If RCAP<QCAPLMTH, the ON/OFF state of the brake switch 45 is read out and whether the vehicle is in a braking state where a brake pedal was operated or not is discriminated (step S37). When the vehicle is in a non-braking state because the brake switch 45 is OFF, the regeneration amount REGEN is obtained from a first deceleration REGEN data map by searching the map (step S38). When the vehicle is in the braking state because the brake switch 45 is ON, the regeneration amount REGEN is obtained from a second deceleration REGEN data map by searching the map (step S39). As shown in FIG. 9, the regeneration amount REGEN in a non-braking period which is determined in accordance with the engine rotational speed $N_e$ and intake pipe inner pressure $P_B$ has previously been written in the ROM 33 as a first deceleration REGEN data map as shown by REGEN#n11~REGEN#n2010. As shown in FIG. 10, the regeneration amount REGEN in a braking period which is determined in accordance with the engine rotational speed $N_e$ and intake pipe inner pressure $P_B$ has previously been written in the ROM 33 as a second deceleration REGEN data map as shown by REGENBR#n11~REGENBR#n2010. The regeneration amount REGEN corresponding to the engine rotational speed $N_e$ and intake pipe inner pressure $P_B$ at that time, therefore, can be searched from the first or second deceleration REGEN data map. In the data maps in FIGS. 9 and 10, as the engine rotational speed $N_e$ is larger, and further, as the intake pipe inner pressure $P_B$ is larger, the regeneration amount REGEN increases. The regeneration amount REGEN in the second deceleration REGEN data map in the brake ON state is larger than that in the first deceleration REGEN data map in the brake OFF state.

Figure 11:
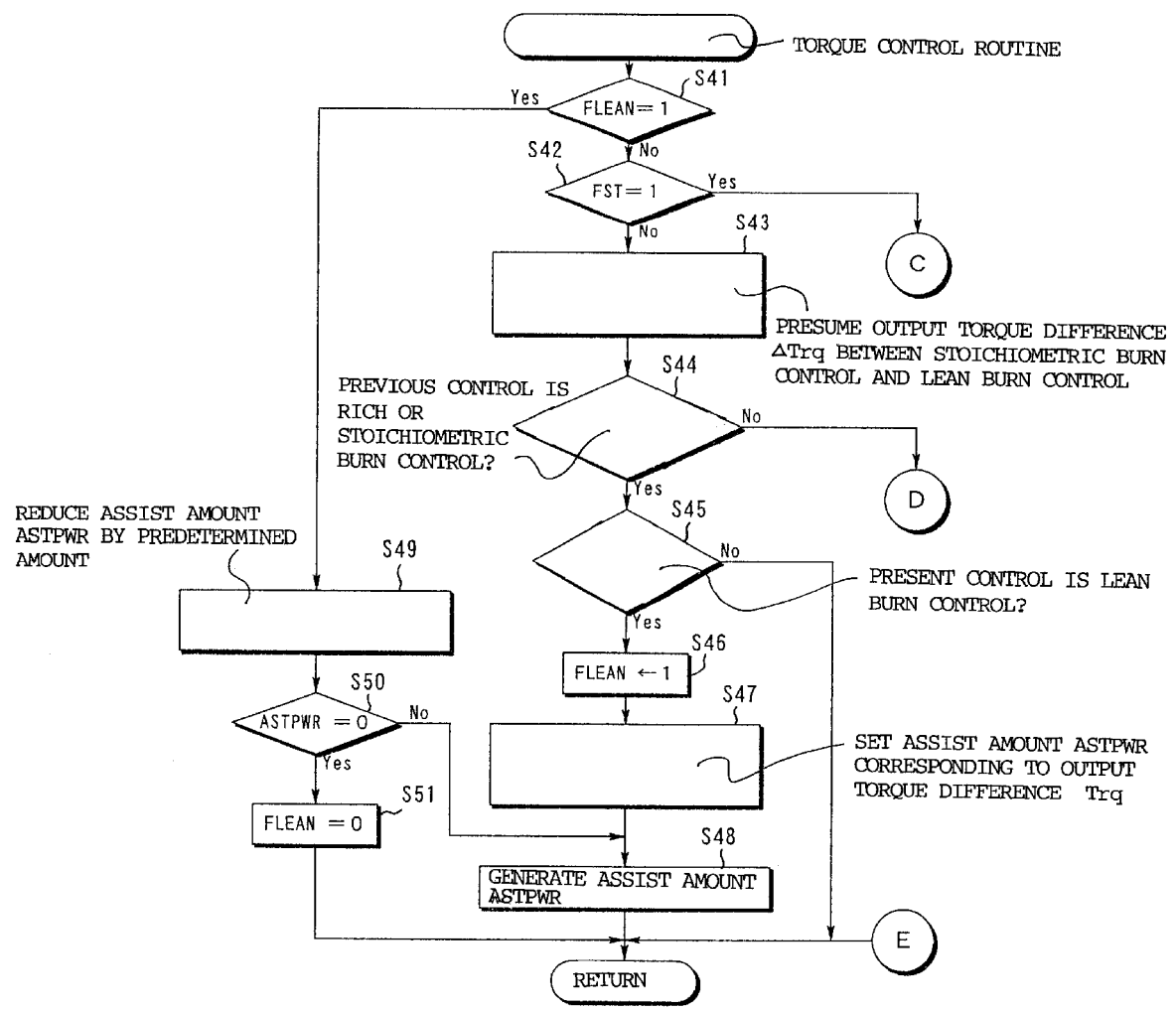
FIG. 11 is a flowchart showing a torque control routine.
Figure 12:
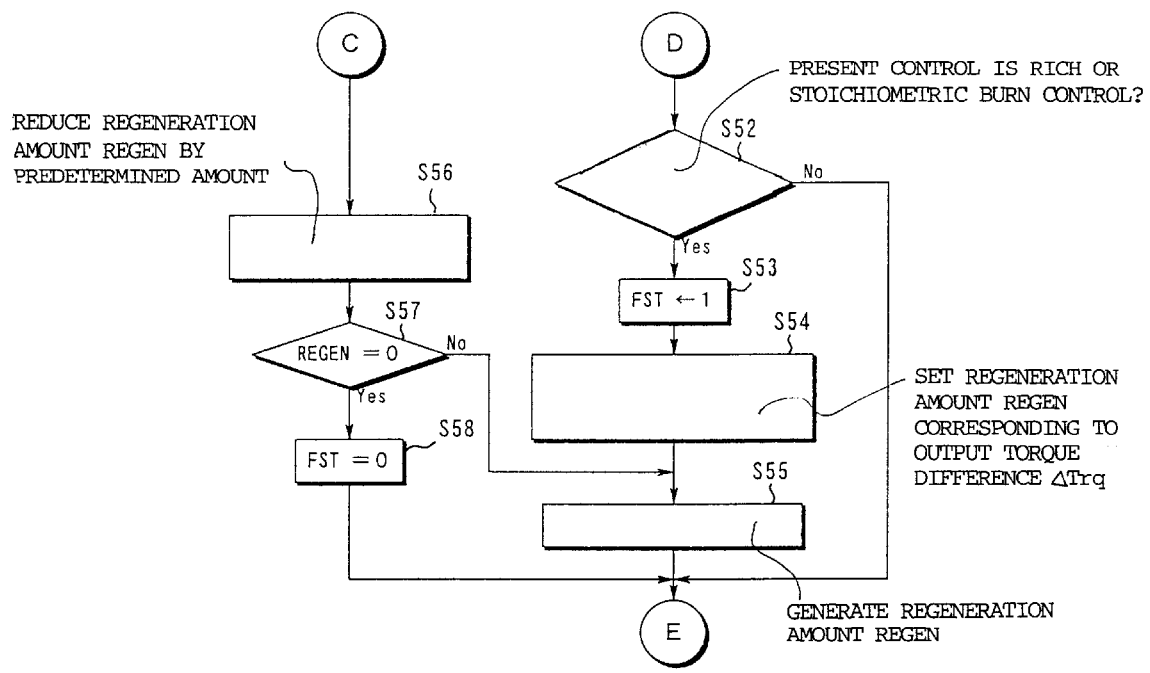
FIG. 12 is a flowchart showing a continuing portion of the torque control routine of FIG. 11.

The CPU 31 processes the torque control routine, for example, at every 10 msec separately from the motor control routine. In the torque control routine, as shown in FIGS. 11 and 12, whether a flag FLEAN which is indicative of lean burn torque correction is equal to "1" or not is first discriminated (step S41). When FLEAN=0, whether a flag FST which is indicative of stoichiometric burn torque correction is equal to "1" or not is discriminated (step S42). When FST=0, a torque difference $\Delta T_{rq}$ between an output torque $T_{rq}ST$ of the engine 1 at the time of the stoichiometric burn control and an output torque $T_{rq}Lean$ of the engine 1 at the time of the lean burn control is presumed (step S43). As shown in FIG. 13, the output torque $T_{rq}ST$ at the time of the stoichiometric burn control which is presumed in accordance with the engine rotational speed $N_e$ and intake pipe inner pressure $P_B$ has been written in the ROM 33 as a stoichiometric torque data map as shown by $T_{rq}ST\#n11 \sim T_{rq}ST\#n2010$. Although not shown, the output torque $T_{rq}Lean$ at the time of the lean burn control which is presumed in accordance with the engine rotational speed $N_e$ and intake pipe inner pressure $P_B$ has been written as a lean torque data map as shown by $T_{rq}Lean\#n11 \sim T_{rq}Lean\#n2010$. Further, an output torque $T_{rq}Rich$ at the time of the rich burn control which is presumed in accordance with the engine rotational speed $N_e$ and intake pipe inner pressure $P_B$ has been written as a rich torque data map as shown by $T_{rq}Rich\#n11 \sim T_{rq}Rich\#n2010$. As the engine rotational speed $N_e$ is larger and as the intake pipe inner pressure $P_B$ is larger, the presumed torque in each torque data map increases. As the air-fuel ratio increases from a lean value to a rich value, the presumed torque increases. In step S43, the output torques $T_{rq}ST$ and $T_{rq}Lean$ corresponding to the engine rotational speed $N_e$ and intake pipe inner pressure $P_B$ at that time are searched from the stoichiometric data map and the lean torque data map, respectively. A difference between the output torques $T_{rq}ST$ and $T_{rq}Lean$ obtained as search results is calculated as a presumed torque difference $\Delta T_{rq}$.

After the process in step S43 was executed, the CPU 31 discriminates whether the previous burn control is the rich burn control or the stoichiometric burn control (step S44). Since an information signal showing to which of the rich burn control, stoichiometric burn control, and lean burn control does the present burn control corresponds can be obtained from the ENGECU 12, the discrimination in step S44 is made by checking the contents of the information signal. For example, in the fuel injection control routine, to which one of the rich burn control, stoichiometric burn control, and lean burn control corresponds can be known from the target air-fuel ratio, so that the information signal can be supplied to the CPU 31 during the process of the fuel injection control routine. If the previous burn control is the rich burn control or the stoichiometric burn control, the CPU 31 discriminates whether the present burn control is the lean burn control or not (step S45). When the previous burn control is the rich burn control or the stoichiometric burn control and the present burn control is also the rich burn control or the stoichiometric burn control, the current processing routine is finished.

Figure 14:
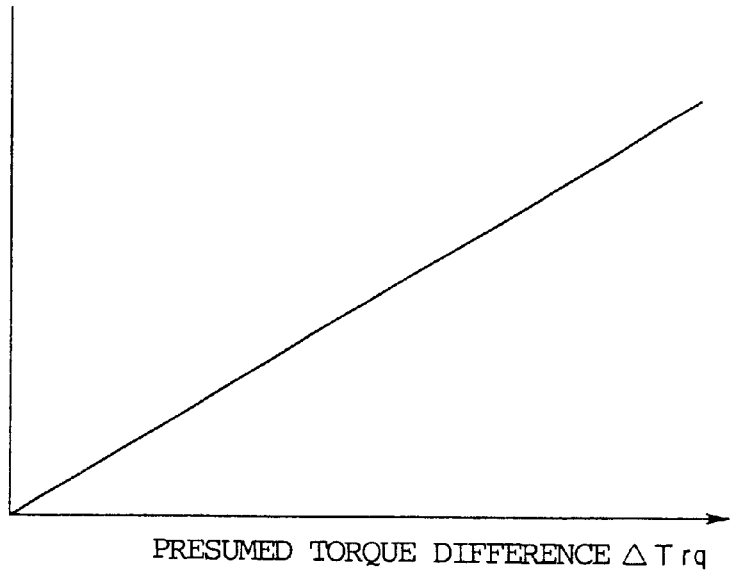
FIG. 14 is a diagram showing a relation between a presumed torque difference and an assist amount or regeneration amount.

When the previous burn control is the rich burn control or the stoichiometric burn control and the present burn control is the lean burn control, this means that the air-fuel ratio is in a sudden changing state to the lean side value, and the flag FLEAN which is indicative of lean burn torque correction is set so as to be equal to "1" (step S46). The assist amount ASTPWR corresponding to the presumed torque difference $\Delta T_{rq}$ is set (step S47). In the relation between the presumed torque difference $\Delta T_{rq}$ and the assist amount ASTPWR, as shown in FIG. 14, as the presumed torque difference $\Delta T_{rq}$ is larger, the assist amount ASTPWR increases. Since the relation has previously been written as a data map in the ROM 33, the CPU 31 obtains the assist amount ASTPWR corresponding to the presumed torque difference $\Delta T_{rq}$ by searching the data map and generates the assist amount ASTPWR to the output I/F circuit 36 (step S48).

When it is determined in step S41 that FLEAN=1, this means that the engine is in a state during the correction of the output torque just after the change to the lean burn control. Then, the assist amount ASTPWR is reduced by a predetermined amount (step S49). Whether the assist amount ASTPWR has reached "0" or not is discriminated (step S50). If ASTPWR>0, step S48 follows. If ASTPWR=0, the flag FLEAN is reset so as to be equal to "0" (step S51). The current processing routine is finished.

Figure 15:
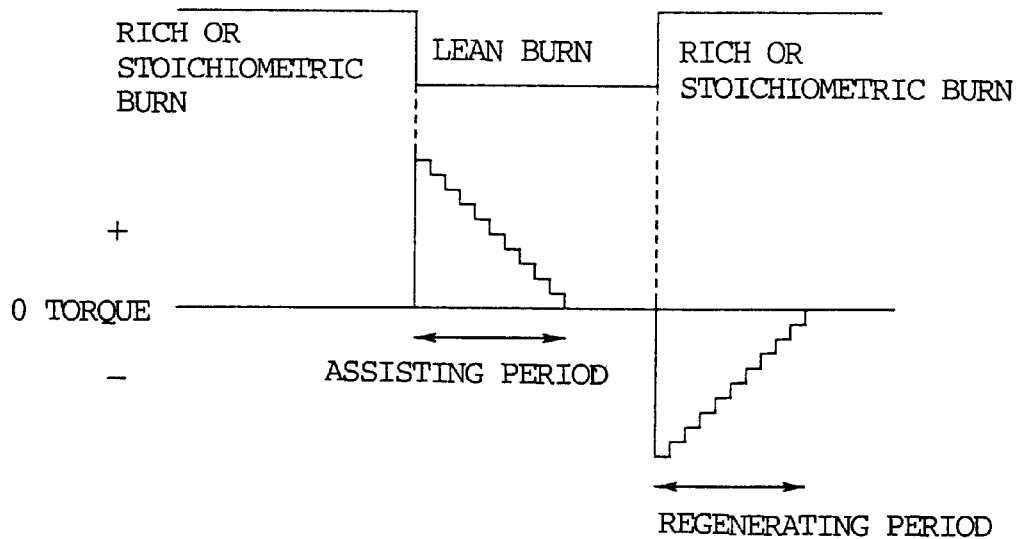
FIG. 15 is a diagram showing a change in output torque assist amount at the time of a lean burn control and a change in output torque reduction amount at the time of a stoichiometric control.

The assist electric power according to the assist amount ASTPWR set as mentioned above is supplied from the PDU 5 to the motor 2. The motor 2 acts as a motor which is driven so as to assist the decreased amount of the output torque of the engine 1. Since the assist amount ASTPWR gradually decreases, an output torque assist amount of the engine 1 by the motor 2 also gradually decreases as shown in FIG. 15. Although a decrease amount and a decreasing time of the assist amount ASTPWR can be properly set, the decrease amount can be set to a constant value.

If it is determined in the discrimination in step S44 that the previous burn control is neither the rich burn control nor the stoichiometric burn control but the lean burn control, the CPU 31 discriminates whether the present burn control is the rich burn control or the stoichiometric burn control (step S52). If the previous burn control is the lean burn control and the present burn control is also the lean burn control, the current processing routine is finished.

When the previous burn control is the lean burn control and the present burn control is the rich burn control or the stoichiometric burn control, this means that the air-fuel ratio is in a sudden changing state from the lean side value to the rich side value. Then, the flag FST which is indicative of stoichiometric burn torque correction is set so as to be equal to "1" (step S53). The regeneration amount REGEN corresponding to the presumed torque difference $\Delta T_{rq}$ is set (step S54). A relation between the presumed torque difference $\Delta T_{rq}$ and the regeneration amount REGEN is similar to that between the presumed torque difference $\Delta T_{rq}$ and the assist amount ASTPWR shown in FIG. 14, namely, as the presumed torque difference $\Delta T_{rq}$ is larger, the regeneration amount REGEN increases. Since the relation has previously been written as a data map in the ROM 33, the CPU 31 obtains the regeneration amount REGEN corresponding to the presumed torque difference $\Delta T_{rq}$ by searching the data map and generates the regeneration amount REGEN to the output I/F circuit 36 (step S55).

When it is determined in step S42 that FST=1, this means that the engine is in a state during the correction of the output torque just after the change to the stoichiometric burn control. Then, the regeneration amount REGEN is reduced by a predetermined amount (step S56). Whether the regeneration amount REGEN has reached "0" or not is discriminated (step S57). If REGEN>0, step S55 follows. If REGEN=0, the flag FST is reset so as to be equal to "0" (step S58). The current processing routine is finished.

The PDU 5 operates so as to obtain the regeneration electric power according to the regeneration amount REGEN set as mentioned above from the motor 2. The motor 2 acts as a generator which performs the regenerating operation so as to reduce the increased amount of the output torque of the engine 1. Since the regeneration amount REGEN gradually decreases, an output torque decrease amount of the engine 1 by the motor 2 also gradually decreases as shown in FIG. 15. Although a decrease amount and a decreasing time of the regeneration amount REGEN can be properly set, the decrease amount can be set to a constant value.

In the fuel injection control routine, the control is temporarily set to the rich burn control at the time of the fuel increase upon acceleration of the internal combustion engine 1, is set to the lean burn control in the case of the cruising driving or a low load, and is usually set to the stoichiometric burn control in the other cases. When the air-fuel ratio changes, therefore, from the rich air-fuel ratio (state in which the fuel is excessive as compared with the stoichiometric air-fuel ratio) smaller than the stoichiometric air-fuel ratio to the lean side value, a situation that the motor is controlled in each of the motor and the generator occurs.

When the lean burn torque correction flag FLEAN or the stoichiometric burn torque correction flag FST is set so as to be equal to "1", the processes of the motor control routine is stopped. Each of the initial values of the lean burn torque correction flag FLEAN and the stoichiometric burn torque correction flag FST is equal to "0".

The embodiment has been described above with respect to the case where the invention is applied to the control apparatus for selectively performing any of the lean burn control in which the air-fuel ratio of the supply air-fuel mixture is controlled to the lean air-fuel ratio, the stoichiometric burn control in which it is controlled to the stoichiometric air-fuel ratio, and the rich burn control in which it is controlled to the rich air-fuel ratio. The invention, however, can be applied to the case where the air-fuel ratio suddenly and largely changes merely to the lean side value or rich side value.

In the above embodiment, when the air-fuel ratio changes to the air-fuel ratio which is richer than the stoichiometric air-fuel ratio or changes from the stoichiometric air-fuel ratio to the air-fuel ratio which is leaner than the stoichiometric air-fuel ratio, the motor 2 operates as a motor. When the air-fuel ratio changes from the air-fuel ratio which is leaner than the stoichiometric air-fuel ratio to the air-fuel ratio which is richer than the stoichiometric air-fuel ratio or the stoichiometric air-fuel ratio, the motor 2 operates as a generator. The invention, however, is not limited to the above cases but the motor 2 can be made operative as a motor when the air-fuel ratio merely changes in the lean direction and can be made operative as a generator when the air-fuel ratio merely changes in the rich direction. For example, the motor 2 can be made operative as a motor when the air-fuel ratio changes in the lean direction in a region where the air-fuel ratio is richer than the stoichiometric air-fuel ratio, or the motor 2 can be made operative as a generator when the air-fuel ratio changes further in the rich direction in a region where the air-fuel ratio is richer than the stoichiometric air-fuel ratio. Moreover, the motor 2 can be made operative as a motor when the air-fuel ratio changes further in the lean direction in a region where the air-fuel ratio is leaner than the stoichiometric air-fuel ratio, or the motor 2 can be made operative as a generator when the air-fuel ratio changes in the rich direction in a region where the air-fuel ratio is leaner than the stoichiometric air-fuel ratio. When the air-fuel ratio changes in the lean direction or the rich direction, if the motor 2 operates as a motor, the driving force of the motor is gradually decreased and, if the motor 2 operates as a generator, the regeneration braking force of the generator is gradually decreased.

In FIGS. 7, 9, and 10 used in the embodiment, as the engine rotational speed and the intake air negative pressure are larger, the assist amount and the regeneration amount of the motor 2 increase.

Although the embodiment has been described above with respect to the case where the transmission mechanism 3 of the vehicle is of the manual type, the invention can be similarly applied to the case where the transmission mechanism 3 is of the automatic type (including the non-stage transmission mechanism). In the automatic type transmission mechanism, the assist amount or the regeneration amount can be searched from the ASTPWR data map in FIG. 7 and the REGEN data maps in FIGS. 9 and 10 in accordance with, for example, the engine rotational speed $N_e$ and vehicle speed $V_s$. The presumed output torque can be similarly searched from the stoichiometric torque data map in FIG. 13 and a rich torque data map (not shown) and a lean torque data map (not shown) in accordance with, the engine rotational speed $N_e$ and vehicle speed $V_s$.

Further, although the MOTECU 11 for motor control and the ENGECU 12 for engine control are individually provided in the embodiment, both the motor and the engine can be controlled by a single ECU.

As mentioned above, in the control apparatus of the hybrid vehicle of the invention, for example, when it is detected that the air-fuel ratio of the supply air-fuel mixture to the engine changed to the lean side value because the control had changed from the stoichiometric burn control to the lean burn control, the electric motor acts as a motor in order to assist the force of the engine just after the detection and, when it is detected that the air-fuel ratio of the supply air-fuel mixture to the engine changed to the rich side value because the control had changed from the lean burn control to the stoichiometric burn control, the electric motor acts as a generator for the purpose of regeneration braking just after the detection, so that the output torque difference of the engine when the air-fuel ratio of the supply air-fuel mixture changes can be sufficiently compensated without a time delay.

In the control apparatus of the hybrid vehicle of the invention, the output torque difference of the internal combustion engine when the change in air-fuel ratio is detected is presumed in accordance with the driving state of the vehicle and the driving force or the regeneration braking force of the electric motor is controlled in accordance with the presumed output torque difference, so that the proper driving state or regenerating state of the motor can be obtained for the output torque difference of the engine when the air-fuel ratio of the supply air-fuel mixture changes.

Further, in the control apparatus of the hybrid vehicle of the invention, when it is detected by the air-fuel ratio detecting means that the air-fuel ratio changed to the lean side value, the electric motor acts as a motor and, thereafter, the driving force of the motor is gradually reduced, and when it is detected by the air-fuel ratio detecting means that the air-fuel ratio changed to the rich side value, the electric motor acts as a generator and, thereafter, the regeneration braking force of the generator is gradually reduced, so that the output torque can be made coincident with the proper output torque after the sudden change of the air-fuel ratio without causing a torque shock.

The invention, therefore, is useful as a control apparatus of the hybrid vehicle.

What is claimed is:

1. An apparatus for controlling a hybrid vehicle having an internal combustion engine and an electric motor as driving sources for the vehicle, said electric motor operating as a motor to assist an output of said internal combustion engine and operating as a generator to regenerate running energy of the vehicle and to charge voltage storage means, said apparatus comprising:

air-fuel ratio detecting means for detecting a change in air-fuel ratio of an air-fuel mixture which is supplied to said engine; and electric motor control means for making said electric motor operative as a motor when it is detected by said air-fuel ratio detecting means that the air-fuel ratio changed from a rich side value to a lean side value, and for making said electric motor operative as a generator when it is detected that the air-fuel ratio has changed from the lean side value to the rich side value, wherein upon detection by said air-fuel ratio detecting means that the air-fuel ratio has changed from the rich side value to the lean side value, said electric motor control means makes said electric motor operative as a motor and, thereafter, gradually decreases a driving force of the motor, and upon detection by the air-fuel ratio detecting means that the air-fuel ratio has changed from the lean side value to the rich side value, said electric motor control means makes said electric motor operative as a generator and, thereafter, gradually decreases a regeneration braking force of the generator.

2. A control apparatus of a hybrid vehicle according to claim 1, wherein said electric motor control means presumes an output torque difference of said internal combustion engine when a change in the air-fuel ratio is detected in accordance with a driving state of said vehicle and controls one of a driving force and a regeneration braking force of said electric motor in accordance with said presumed output torque difference.

3. An apparatus for controlling a hybrid vehicle having an internal combustion engine and an electric motor as driving sources for the vehicle, said electric motor operating as a motor to assist an output of said internal combustion engine and operating as a generator to regenerate running energy of the vehicle and to charge voltage storage means, said apparatus comprising:

burn-control means for selectively performing one of a stoichiometric burn control, a lean burn control and a rich burn control for said engine in accordance with a driving state of said vehicle;

air-fuel ratio detecting means for detecting a change in an air-fuel ratio of air-fuel mixture which is supplied to said engine; and electric motor control means, when it is detected by said air-fuel ratio detecting means that the air-fuel ratio changed from a rich side value which is equal to or smaller than a stoichiometric air-fuel ratio, to a lean side value which is larger than the stoichiometric air-fuel ratio, for making said electric motor operative as a motor, and, thereafter, gradually decreasing a driving force of the motor, and when it is detected that the air-fuel ratio has changed from the lean side value to the rich side value, for making said electric motor operative as a generator and, thereafter, gradually decreasing a regeneration braking force of the generator.

4. A control apparatus of a hybrid vehicle according to claim 3, wherein said electric motor control means presumes an output torque difference of said internal combustion engine when a change in the air-fuel ratio is detected in accordance with a driving state of said vehicle and controls one of a driving force and a regeneration braking force of said electric motor in accordance with said presumed output torque difference.

* * * * *